United States Patent Office 3,051,337
Patented Aug. 28, 1962

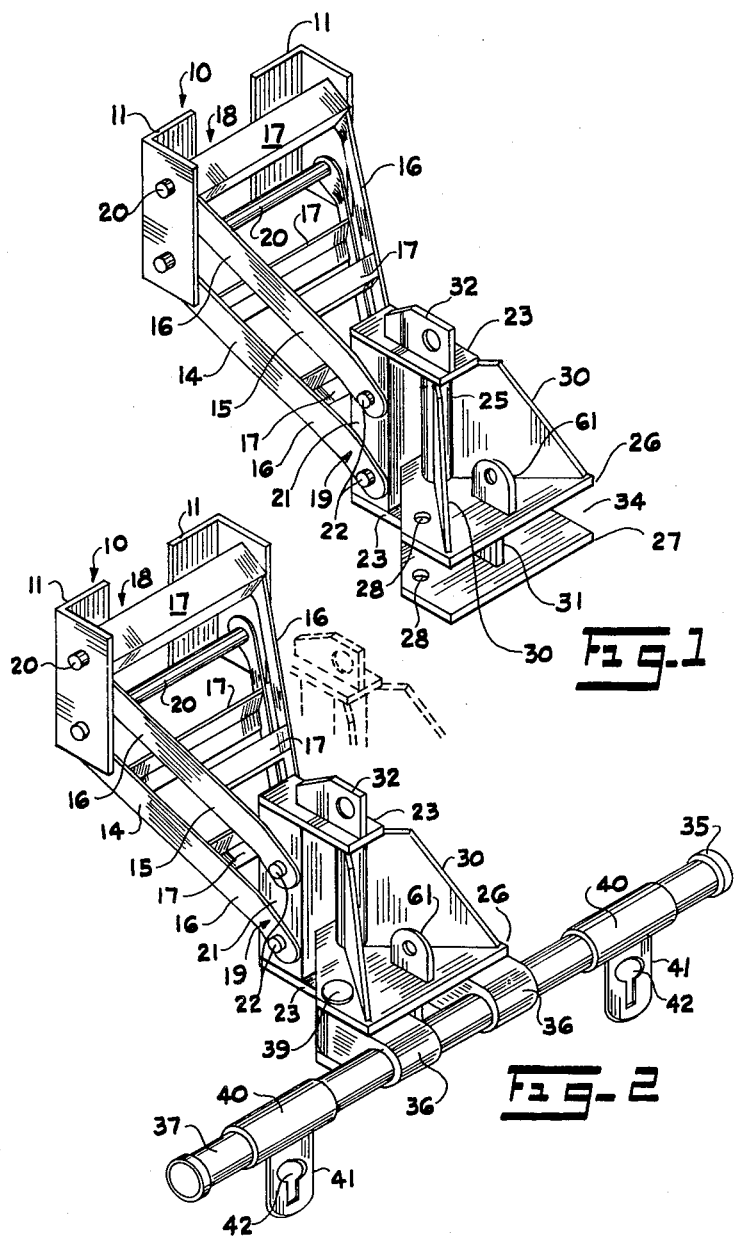

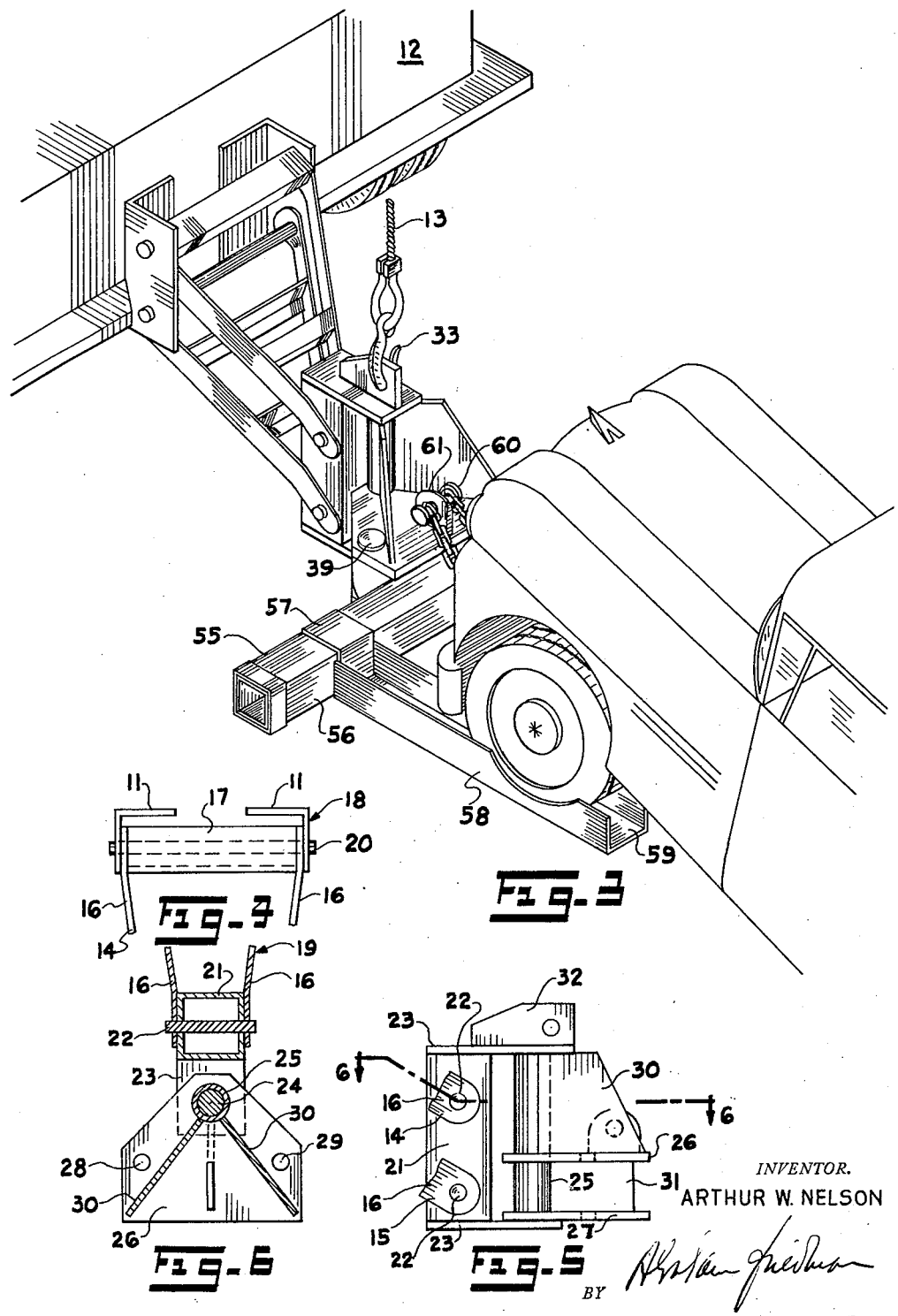

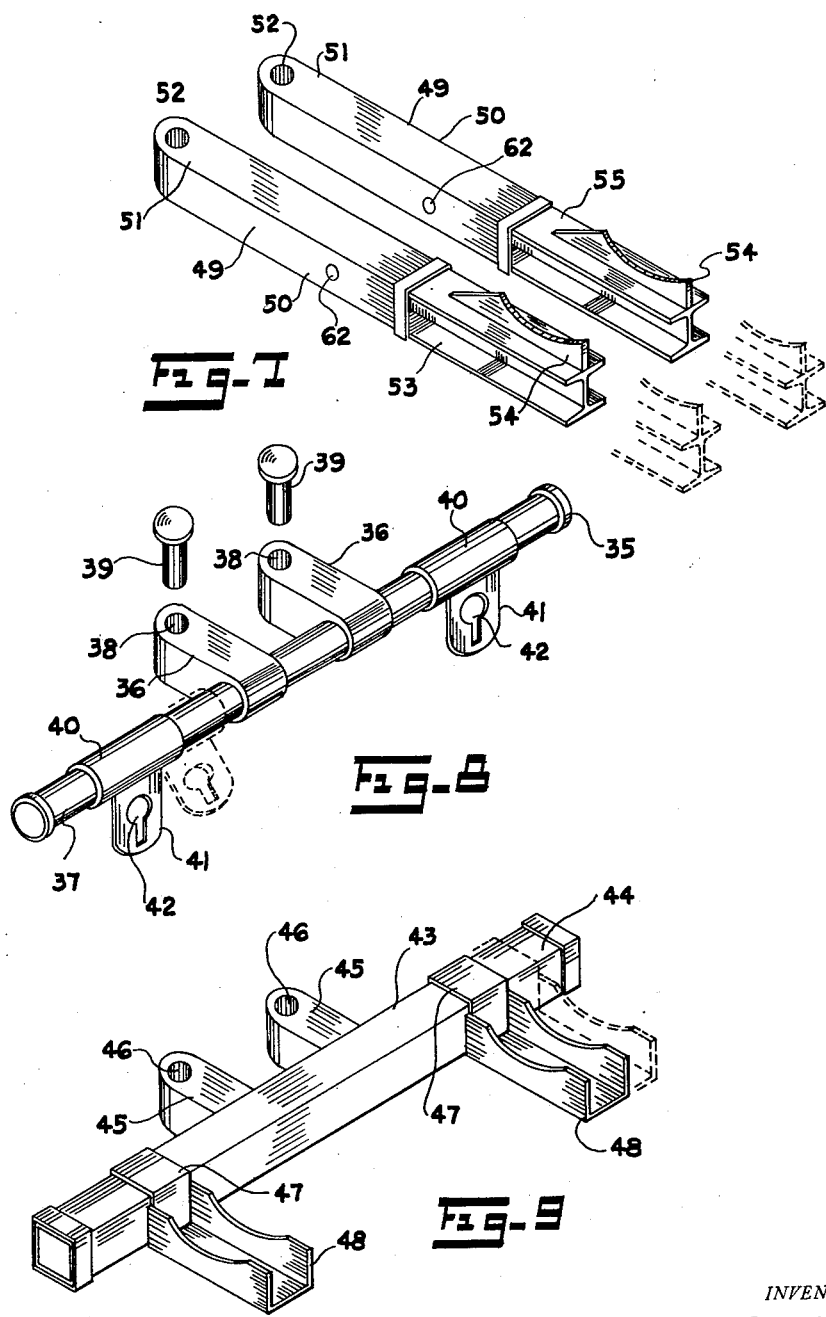

3,051,337
AUTOMOBILE TOWING DEVICE
Arthur W. Nelson, 5903 Preston Court, Brooklyn, N.Y.
Filed July 1, 1958, Ser. No. 745,976
3 Claims. (Cl. 214—86)

This invention relates to an automobile towing device and more particularly to an automobile towing device provided with a plurality of interchangeable towing accessories in the form of adapters, attachments or coupling devices.

Towing cars or trucks for towing wrecked or disabled automobiles are required to operate under varying conditions for efficiently and safely transporting such vehicles from place to place. These circumstances may arise from the variations in the location and extent of the damage to which the disabled or wrecked vehicle may have been subjected, or may arise from the structural differences encountered in the diversity of makes and models of automobiles. Thus, for example, the overhang of modern grille work or bumpers may require the use of a particular type of towing accessory in the form of an attachment, adapter or coupler in order to provide the proper clearance for these parts and to prevent additional damage during the towing operation. Similarly, the particular form of wheel suspension or other structural characteristic of the towed vehicle may require the use of a quite different form of adapter, attachment or coupling means for effective and safe towing. In addition to the necessity of providing a suitable towing accessory means, it is essential that the overall towing device present a convenient arrangement for appropriately locating or disposing the accessory means with respect to the towed vehicle and for securely supporting the damaged or disabled vehicle during the towing operation. Such overall towing device must provide a structural arrangement for effectively positioning and guiding the towed vehicle in a safe manner and under constant control.

It is therefore one of the objects of this invention to provide a towing device which is initially readily attached to or mounted upon a wrecker or towing vehicle and which may be conveniently operatively associated with a towed vehicle while maintaining the said vehicle under effective and safe control at all times.

It is an additional object of this invention to provide a towing device of the character indicated which is also provided with means for mounting a variety of interchangeable towing attachments, adapters or couplings, each of which may be readily attached, removed and replaced; the unused attachments being conveniently stored in the wrecker in a minimum amount of space.

Another object of this invention is to provide a device of the character indicated with an improved linkage system whereby it may be located in any desired position with respect to the towed vehicle while the tow is made up and during the actual towing operation; the said towing arrangement providing a stable linkage system between the respective vehicles with appropriate pivotal action for effective and safe guidance of the towed vehicles over bumps, around curves, and the like.

A further object of this invention is to provide a towing device of the character indicated with means for detachably receiving complementary means carried by towing attachments, or adapters, or coupling devices to provide a simple but effective interengagement between these parts commensurate with the requirements of towing operations.

It is also an object of this invention to provide novel forms of towing accessory means for securing and supporting a vehicle for towing purposes.

Other and further objects, benefits and advantages of this invention will be more fully disclosed herein and will become apparent from the drawings, specifications and claims hereof.

In the accompanying drawings:

FIGURE 1 is an isometric view of the towing device comprising the present invention.

FIGURE 2 is a view similar to FIGURE 1 showing one form of towing accessory in position.

FIGURE 3 is an isometric view showing the towing device mounted upon the tail-gate of a towing vehicle and another form of towing accessory operatively associated with a towed vehicle.

FIGURE 4 is a fragmentary plan view of the base portion of the towing device.

FIGURE 5 is a fragmentary side elevational view of the apex portion of the device.

FIGURE 6 is a cross section of FIGURE 5 taken along line 6—6 thereof.

FIGURES 7, 8 and 9 are isometric views of various forms of towing accessories adapted to be operatively associated with the towing device.

As may be more clearly seen from FIGURES 1, 2 and 3, the towing device comprising the present invention designated generally by the numeral 10, comprises a pair of vertically disposed angle bars 11, which are mounted in spaced apart relationship upon the tail-gate of a towing vehicle 12 by any suitable means, such as: welding, riveting, or by means of bolts. The towing vehicle 12 is of a conventional type and is provided with a derrick or crane not shown, from which a lifting cable 13 is suspended and adapted to be raised and lowered as required in use. The angle bars 11 form a rigid supporting structure for the device. A pair of generally triangular linkage members 14 and 15 extend horizontally from the base angle bars 11 and comprise side bars 16, which are interconnected by means of transverse braces 17. The transverse braces 17 are advantageously formed of angle bars which are welded to the side bars 16 in the region of their terminal portions. The side bars 16 for each of the linkage members diverge in the forward direction with respect to the towing vehicle to form the base portions 18 for the linkage members and converge in the rearward direction to form apex portions 19 for the linkage members, as may be more particularly seen in FIGURES 4 and 6. The terminal portions of the side bars at the base of the triangular linkage members are apertured, and being positioned in registration with similar apertures formed in the vertical angle bars 11, receive the pivot pins 20 which extend transversely between the vertical angle bars 11 and thus form pivotal connections for the base portions of each of the linkage members 14 and 15 for pivotal movement in a vertical plane. The rearward or apex ends of the linkage members 14 and 15 are interconnected by means of a vertically disposed movable link 21.

Vertical link 21 comprises a section of rectangular tubing which is provided with planar side walls having registering apertures within which pivot pins 22 are received and extend through similar registering apertures formed in the apex portions of the linkage members 14 and 15.

It will be apparent, therefore, that a parallelogram type linkage is established whereby the pivotal connection of the horizontally extending linkage members with the vertical link 21 limit the movement of the vertical link to a vertical plane and maintain it in substantial parallelism with the angle bars 11. A pair of tie plates 23 are secured to the upper and lower extremities of the vertical link 21 as by welding and overlie the said extremities. Said tie plates 23 extend horizontally rearwardly of the parallelogram linkage system and are secured to the extremities of pivot post 24, as may be more particularly seen from FIGURES 5 and 6. Vertically disposed pivot post 24 advantageously comprises a solid steel cylindrical bar, is axially aligned with the axis of the vertical link 21 and is fixedly maintained in parallel spaced relationship thereto by means of said horizontal tie plates 23. Pivot post 24 is surrounded by a cylindrical sleeve 25 which is rotatably mounted thereon. The lower portion of cylindrical sleeve 25 has secured thereto horizontally extending socket plates 26 and 27. Socket plates 26 and 27 are advantageously formed of sheet steel, each provided with an aperture within which sleeve 25 is received and to which it is secured as by means of a circumferential weld. Socket plates 26 and 27 are of a substantially similar configuration and are disposed in a horizontal plane in vertical parallel spaced relation to each other. Said plates extend rearwardly of cylindrical sleeve 25 and are provided with pairs of aligned apertures 28 and 29, the purpose of which will more clearly appear hereafter. A pair of reinforcing webs 30 are secured along portions of their peripheral edges to the upper surface of socket plate 26, the sleeve 25 and the upper tie plate 23. Said reinforcing webs are disposed in divergent relation so as to provide a rigid reinforcement for the upper socket plate 26. A spacing web 31 is disposed intermediate socket plates 26 and 27 for maintaining the plates in appropriately spaced relation and for the purpose of acting as a central partition therefor. It will be apparent that the combination of the upper and lower socket plates forms a socket-like enclosure within which the mounting bosses of the towing accessories are removably received.

A lifting lug 32 is secured to the upper tie plate 23 and comprises an apertured vertically disposed steel plate which is adapted to receive a hook 33 secured to the lifting cable 13. By this means, the apex portion of the device, including the movable link and pivotally mounted socket plates, are raised or lowered as required. The parallelogram linkage arrangement maintains the vertical link and pivot post in a substantially vertical position at all times and for all elevations thereof, while the socket plates are maintained in a substantially horizontal disposition. Furthermore, it will be apparent that by reason of the rotatable mounting of the cylindrical sleeve, the entire socket arrangement may be pivoted on the vertical axis of the pivot post 24 in a horizontal plane.

The socket-like enclosure 34, thus formed between the socket plates 26 and 27 and the intermediate spacing web 31, is adapted to receive the laterally spaced mounting bosses of various forms of towing accessories adapted to be operatively associated with the towing device. Thus, as shown in FIGURE 2, a tow bar 35 may be mounted in the socket enclosure 34 by means of laterally spaced horizontally extending bosses 36. The arrangement of tow bar 35 may be also seen from said figure as well as FIGURE 8. Tow bar 35 comprises a laterally extending cylindrical tube 37 which is provided with normally extending parallel spaced bosses 36. The bosses 36 are each of a rectangular cross section and provided with vertically extending apertures 38. The bosses 36 are so disposed and dimensioned as to snugly fit in the space between the socket plates 26 and 27 and to abut with the confronting surfaces thereof. Apertures 38 are disposed to register with apertures 28 and 29 in the upper and lower socket plates so that headed pins 39 may be inserted through the registering apertures of the socket plates and the bosses to thereby firmly fix said bosses in a horizontally disposed position and securely mount the tow bar. Tow bar 35 is additionally provided with a pair of rotatable sleeves 40 which are free for lateral movement along portions of the length of cylindrical tube 37 so as to enable them to be adjusted to any desired position therealong. Each of sleeves 40 is provided with a projected tab 41 in the body of which a key slot 42 is formed for the purpose of receiving and securing a tow chain in position, as is well known to those skilled in the art.

It will be apparent that with the tow bar thus mounted in position, it may be raised or lowered as desired and the spacing between the towing vehicle and the tow bar will remain substantially constant regardless of the elevation of the apex portion of the parallel linkage, while the axis of the tow bar will remain disposed in a horizontal plane. Thus, the entire towing device including the tow bar may be lowered for the purpose of attachment to appropriate portions of the towed vehicle and thereupon raised to any desired elevation for efficient towing. Furthermore, the pivotal arrangement of the socket within which the tow bar is mounted, permits it to be pivoted in accordance with the requirements of the road bed along which the vehicle is being moved, as around corners and curbs. When it is not desired to employ the tow bar, the pins 39 are manually withdrawn and thereupon, the tow bar bosses 36 may be withdrawn from the socket and placed into the body of the wrecker until desired for further use.

The towing device heretofore described is adapted to be used with other forms of towing accessory. Thus, for example, FIGURE 9 illustrates a form of tow cradle 43 which may be readily mounted as part of the towing device. Said tow cradle comprises a tubular member of rectangular cross section 44, which is provided with laterally spaced projecting bosses 45, through which vertically disposed apertures 46 extend. The tubular member 44 is provided with tubular sleeves 47 which are laterally slideable therealong. Each of sleeves 47 has additionally secured thereto a horizontally extending channel member 48. The tow cradle illustrated in FIGURE 9 is mounted as part of the towing device in the manner heretofore described with respect to the tow bar illustrated in FIGURE 8. Similarly, when so mounted, the entire cradle may be lowered to the desired level to bring it into proximity to the disabled car body and to engage with such portion thereof as may be desired, as for example, a wheel suspension, axle or bumper. The tow cradle is removed by the withdrawal of pins 39 from the apertures in the socket plates and bosses whereupon the entire tow cradle accessory portion of the device may be withdrawn and stored in the wrecker body.

It will be noted that a tow cradle of this character is readily adapted to be manipulated to a position wherein it will engage with the desired portion of the disabled car and that the channel portions of the cradle may be laterally adjusted in accordance with the requirements of the particular vehicle. Furthermore, it will be noted that by reason of the linkage arrangement the channel members 48 are constantly maintained in a substantially horizontal plane regardless of the degree of elevation of the linkage arrangement so as to provide for a most efficient form of support for the towed vehicle. The rectangular configuration of the tubular member upon which rectangular sleeves 47 are mounted provides an efficient structure to counteract the various torsional forces to which a device of this character is subjected during use and assures that the towed vehicle will be maintained in the desired position during the entire towing operation.

FIGURE 7 illustrates a modified form of tow cradle which is adapted for use where longer support members are required to reach the appropriate structural portion of the towed vehicle by means of which it may be supported, or to clear various forms of projections which are found in some makes and models of cars, as for instance, extensive grille work and bumpers. The towing accessory arrangement illustrated in FIGURE 7 comprises a pair of tow cradle arms 49 of similar construction. Each of said tow cradle arms 49 comprises a rectangular tubular member 50, one end of which forms a boss 51 through which a vertically disposed aperture 52 is formed. The tubular member 50 telescopically receives an I-beam 53 from which a concavely arcuate supporting plate 54 projects vertically. Each of the tow cradle arms 49 are adapted to be mounted in the socket portion 34 of the towing device by insertion of a terminal boss portion 51 thereof between socket plates 26 and 27 so that aperture 52 is brought into registration with one of the bars of apertures 28 or 29. The insertion of the pin 39 securely mounts the tow cradle arm in position. However, in view of the independence of each of the cradle arms, the pin 39 acts as a pivot pin and each cradle arm may then be pivoted upon the axis of its associated pin. This permits the lateral adjustment of the cradle arms for the purpose of accommodating various forms and widths of vehicles and provides for an additional pivotal movement during the towing operation. The telescopic construction of the arms permits the concavely arcuate supporting plates 54 to be located at any desired point under the towed vehicle. The I-beam is fixed by set screw 62.

FIGURE 3 further illustrates a form of tow cradle of novel form wherein a towed vehicle may be supported upon its own wheels. The tow cradle 55 is of similar construction to the tow cradle shown in FIGURE 9 and is provided with a rectangular tubular laterally extending member 56, upon which rectangular sleeves 57 are mounted in the manner of sleeves 47, so that they may be laterally adjusted along the rectangular tubular element 56. Sleeve members 57 are provided with elongated channel members 58 which are disposed and secured to the sleeves in a manner similar to that of channel members 48. The channel members 58 comprise tracks along which the wheels of a towed vehicle are adapted to roll. Thus, in this form of towing accessory, the cradle is lowered to the surface of the ground or pavement so that the vehicle wheels may be readily rolled upon tracks 59. Having been rolled into position upon said tracks, the vehicle may then be secured against rearward movement by means of a chain or cable 60 engaged on some portion of the towed vehicle and secured to lug 61, as in the case of any vehicle using one of the other accessories. Thereupon, the entire device is raised by means of cable 13 to the desired elevation for efficient and safe towing thereof. It will be noted that by reason of the socket arrangement the channel members 58 which comprise the tracks for the vehicle are constantly mounted in a horizontal plane regardless of the degree of elevation to which the device is subjected.

From the foregoing, it will be apparent that a towing device is provided which is adapted to receive various forms of towing accessories, each of which may be readily mounted thereon and removed therefrom as desired and which accessories may be readily stored in a minimum amount of space within the tow car body. Thus, the operator has available to him a wide selection of towing accessories which he may selectively employ in accordance with the requirements of the particular vehicle or operation which he is performing. In view of the fact that the towing accessory is of relatively light construction as compared to many of the devices heretofore employed, it may be manipulated by the operator and removed and replaced with a minimum of effort for this type of equipment. The socket arrangement functions to retain the towing accessory in firm and secure position regardless of the torsional forces to which a device of this character is subjected in use.

I have here shown and described preferred embodiments of my invention. It will be apparent, however, that this invention is not limited to these embodiments, and that many changes, additions and modifications can be made in connection therewith without departing from the spirit and scope of the invention as herein disclosed and hereinafter claimed.

Having disclosed my invention, what I claim as new and desire to secure by Letters Patent is:

1. A towing device including support means for rigid attachment to the rear of a towing vehicle, a socket for disengageably retaining a towing accessory in operative position between the towing and a towed vehicle, said socket comprising a pair of parallel plates fixedly secured to each other in vertically spaced relation to thereby define a socket having planar top and bottom walls, a parallelogram linkage arrangement interconnecting said socket and said support whereby said socket is maintained in horizontal disposition, in combination with a towing accessory adapted to be mounted in said socket, said towing accessory including a boss extending therefrom, said boss being adapted to be received within said socket space and being provided with planar top and bottom walls for abutment with the planar top and bottom walls of said socket, means for disengageably locking said boss in position within the socket.

2. In a towing device, a towing accessory therefor, said accessory comprising an elongated bar of rectangular cross section, a pair of rectangular sleeves slideably disposed upon said bar, a channel member secured to each of said sleeves, said channel member comprising a trackway for the wheels of a vehicle, means carried by said bar for mounting it in position on said device.

3. A towing device comprising support means for rigid attachment to the rear of a towing vehicle, horizontally disposed upper and lower generally triangular vertically spaced linkage members each provided with a base portion and a truncated apex portion and pivotally connected to said support means along the base portion thereof, a vertically disposed link member pivotally secured to the apex portion of each of said triangular links, a pivot post secured to said vertical link in parallel spaced relation thereto, a sleeve rotatably carried by said pivot post, a pair of plates secured to said sleeve for movement therewith, said plates being horizontally disposed in parallel vertically spaced relation to each other thereby defining a socket having horizontally disposed co-planar walls adapted to receive the complementary mounting boss of a towing accessory, said socket permitting a variety of towing accessories to be interchanged and disposed in vehicle towing position.

References Cited in the file of this patent

UNITED STATES PATENTS

| | | |
|---|---|---|
| 2,183,478 | Holmes et al. | Dec. 12, 1939 |
| 2,726,777 | Wiley | Dec. 13, 1955 |
| 2,937,772 | Sullivan | May 24, 1960 |

FOREIGN PATENTS

| | | |
|---|---|---|
| 687,492 | Great Britain | Feb. 18, 1953 |